UNITED STATES PATENT OFFICE.

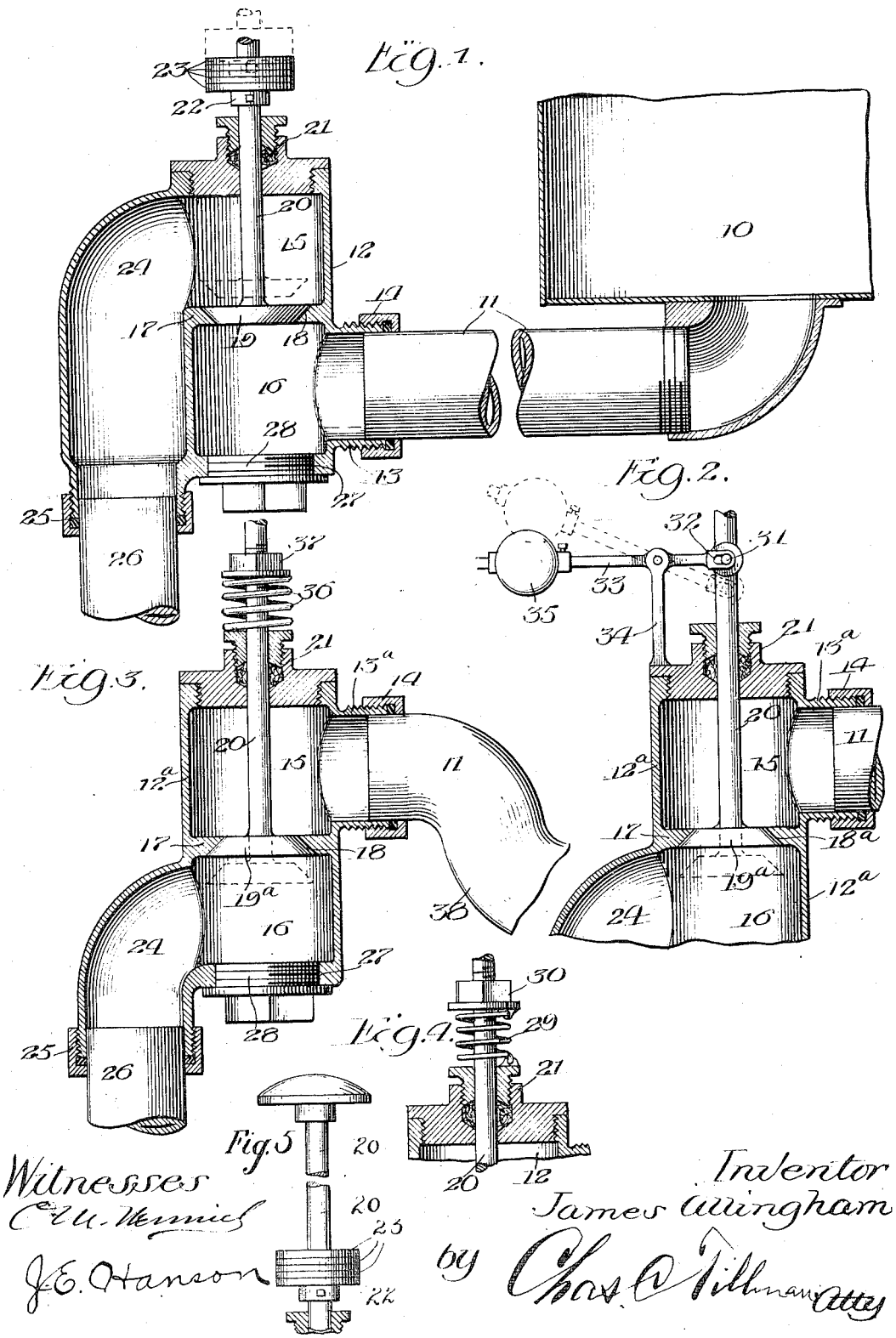

JAMES ALLINGHAM, OF CHICAGO, ILLINOIS.

HYDRAULIC AND AUTOMATIC WASTE-VALVE FOR VESSELS.

1,049,328.

Specification of Letters Patent. Patented Jan. 7, 1913.

Application filed July 31, 1909. Serial No. 510,648.

*To all whom it may concern:*

Be it known that I, JAMES ALLINGHAM, a citizen of the United States, residing at Chicago, in the county of Cook and State of Illinois, have invented certain new and useful Improvements in Hydraulic and Automatic Waste-Valves for Vessels, of which the following is a specification.

This invention relates to automatic waste valves for liquid containing vessels, and consists in certain peculiarities of the construction, novel arrangement and operation of the various parts thereof, as will be hereinafter more fully set forth and specifically claimed.

One of the objects of the invention is to provide an automatic waste valve for vessels of various kinds, but particularly for bath-tubs, wash-basins, and sinks, which shall be simple and inexpensive in construction, easily attached, compact in form, durable, readily understood, operated and cleaned, and which will serve the function of a positive trap as well as a water seal.

Another object is to provide a waste valve for vessels that will act or waste automatically at a given pressure of liquid, and which shall have manual means for discharging all or any desired amount of liquid from the vessel, and for the following reasons it is especially adapted for use on bath-tubs, wash-basins, and sinks: 1. When used in connection with a bath-tub or wash bowl, it will cheapen the construction thereof by dispensing with the overflow opening in the tub, and the overflow chamber in the wash bowl, besides doing away with the necessary connections with said parts. 2. It does away with all of the fouling surface contained in the overflow pipes of bath-tubs, and all the fouling surface contained in the overflow chamber of wash bowls, besides it entirely cuts off the connection with the drain pipes leading from the tub or bowl, thereby avoiding all the insanitary conditions known to exist, and to be detrimental to health in all of the devices that have heretofore been used for that purpose.

Other objects of the invention, will be disclosed in the subjoined description and explanation.

In order to enable others skilled in the art to which my invention pertains, to make and use the same, I will now proceed to describe it, referring to the accompanying drawing, in which—

Figure 1, is a vertical sectional view of a portion of a vessel with an automatic waste valve embodying one form of the invention mounted on the waste pipe thereof. Fig. 2, is a similar view of a portion of a waste pipe of a vessel, showing a valve mounted thereon, and illustrating a modification in its construction. Fig. 3, is a similar view of like parts, showing still another modified form in the construction of the valve. Fig. 4, is a detail view partly in section and partly in elevation of the upper portion of the valve casing and valve stem shown in Fig. 1, illustrating modified means for holding the valve in its closed position. And Fig. 5, is a view of the upper portion of the valve stem showing a knob for manually operating the same.

Like numerals of reference, refer to corresponding parts throughout the different views of the drawing.

The reference numeral 10, designates a portion of a vessel which may be of any suitable kind, and has communicating with its lower portion, a waste pipe 11, to which the valve casing may be connected in any suitable manner, but in the present instance I have shown the valve casing 12, provided on the lower portion of one of its walls with a lateral extension 13, which is externally screw-threaded to engage a coupling or collar 14, fitted around the outer portion of the pipe 11, which pipe is located at its outer end within the extension 13, of the valve casing. As shown, the valve casing 12, is provided with upper and lower compartments 15, and 16, respectively, which are divided by means of a transverse partition 17, in which is provided a downwardly tapered opening 18, to form a seat for the correspondingly tapered valve 19, the stem 20, of which is extended through a stuffing-box 21, on the upper portion of the casing. Above the stuffing-box 21, the valve stem 20, is provided with a collar 22, on which are located a number of detachable weights 23, used to hold the valve 19, in its seated position, until a given degree of liquid pressure is exerted on the valve to force it upwardly, and thus automatically permit the liquid to be discharged from the vessel through the pipe 11, and chamber 16, thence through the opening 18, chamber 15, and conduit 24, which leads from one side of the chamber 15, downwardly, and may have connected to its lower portion by means of a coupling 25, or otherwise, a drain pipe 26, leading to the sewer or other point of discharge.

The bottom of the chamber 16, is provided with an opening 27, in which is fitted a plug 28, which can be easily removed when access to the interior of the valve casing is required or desired for the purpose of cleaning or repairing the parts.

In the construction above described, it is apparent that the pressure of the liquid contained in the vessel 10, pipe 11, and chamber 16, will be exerted upwardly against the bottom of the valve 19, and when sufficient pressure is attained, to overcome the weights 23, the valve will be moved upwardly, thus permitting the water or liquid to flow upwardly through the opening 18, in the partition 17, and then outwardly through the chamber 15, and downwardly through the conduit 24, into and out through the pipe 26, to the sewer or other point.

As the weights 23, are detachable, it is apparent that any desired number thereof, may be placed on the stem 20, so that the liquid pressure required to operate the valve, may be varied. As the pipe 11, is located below the bottom of the vessel, and as the outlet opening 18, of the chamber 16, is located in substantially a horizontal plane with the bottom of the vessel, it is apparent that said chamber and pipe will form a positive trap, as well as a water seal, thus preventing the escape of gases from the sewer through the pipe 26, and its connections with the vessel.

Instead of employing the detachable weights 23, on the valve stem 20, for the purpose of regulating the liquid pressure required to operate the valve, a contracting spring 29, surrounding the upper portion of the stem 20, and secured at one of its ends to a portion of the stuffing-box 21, and at its other end to a nut 30, in screw engagement with the stem 20, (see Fig. 4,) may be employed, in which operation it is evident that the valve 19, will be pressed downwardly and firmly held in its seat by the action of the spring 29, and that by loosening or tightening the nut 30, on the stem, the tension of said spring may be regulated so as to require more or less liquid pressure to operate the valve.

In Fig. 2, is shown a modification in the construction of the valve, which consists in employing a valve casing 12ª, having upper and lower chambers 15, and 16, respectively, and divided by a horizontal or transverse partition 17, as in the other construction. In this modified form of the valve, the partition 17, is provided with an upwardly tapered opening or valve seat 18ª, for a correspondingly tapered valve 19ª, the stem 20, of which, is extended through a stuffing-box 21, on the upper portion of the valve casing, and has above the stuffing-box, a pin or projection 31, to fit in a slot 32, formed in one end of a lever 33, which is fulcrumed on a suitable support 34, mounted on the upper part of the valve casing or otherwise. Adjustably mounted on the outer portion of the lever 33, is a weight 35, which will hold the valve 19ª, in its raised or seated position until the liquid pressure contained in the chamber 15, pipe 11, and vessel, is sufficient to overcome the weight 35, when it is apparent that the valve 19ª, will be lowered to about the position shown by dotted lines in Fig. 2, thus permitting the liquid to pass from the chamber 15, through the opening 18ª, into the chamber 16, and from thence out through the conduit 24, and drain pipe to the sewer. In this modified construction, it will be observed that the pipe 11, is connected to an extension 13ª, having communication with the upper chamber 15, instead of the lower chamber 16, as in the other construction, and that the conduit 24, has direct communication with the chamber 16, instead of with the chamber 15, as in the first described form of the valve.

In Fig. 3, is shown still another modification in the construction of the valve, which consists in employing a casing of similar construction to that shown in Fig. 2, and just above described, that is to say, the pipe 11, has communication through an extension 13ª, with the upper chamber 15, while the conduit 24, leads from the lower chamber 16; and the valve 19ª, and its seat 18ª, is upwardly tapered, and adapted to be operated by the downward pressure of the liquid. In this modification, an expanding spring 36, surrounding the valve stem 20, above the stuffing-box 21, and resting at one of its ends on a portion of the stuffing-box, and at its other end against a nut 37, in screw-engagement with the stem 20, is employed to hold the valve in its raised or seated position, and against liquid pressure in the vessel, pipe 11, and upper chamber 15, of the valve casing. As the nut 37, is adjustable on the stem 20, it is apparent that the tension of the spring 36, may be regulated so as to require more or less liquid pressure to operate the valve.

It will be understood by referring to Figs. 2, and 3, that the pipe 11, is provided between its ends, which are connected to the valve casing and vessel, with a downwardly disposed bend 38, which will afford a water seal and that the liquid in passing from the vessel out through the valve casing, will have an upward and then downward passage-way, as in the first described construction.

It is evident that the valve stem 20, may be extended upwardly for any considerable distance and may be provided at its upper portion with a knob or any desired means by which the rod and valve may be operated manually.

From the foregoing and by reference to the drawing, it will be apparent that the device is susceptible of considerable modification without material departure from the principle and spirit of the invention, and for this reason I do not desire to be understood as limiting myself to the precise form and arrangement of the several parts of the device as herein set forth in carrying out my invention in practice.

Having thus fully described my invention, what I claim as new and desire to secure by Letters-Patent, is—

1. A valve of the character described, consisting of a casing having an inlet and an outlet arranged thereon, a valve seated within the casing between the same, a stem on the valve extended through an opening in the casing for reciprocal movement, means for automatically closing the valve and to regulate the movement thereof relative to a fluctuating pressure of fluid in a vessel, and manual means for reciprocating the stem thereby opening and closing the valve for discharging all or any desired amount of fluid contained in the vessel.

2. A valve of the character described, consisting of a casing having an inlet and an outlet arranged thereon, a valve seated in the casing between the same, a stem extended through an opening in the casing and arranged for reciprocal movement therein, adjustable means for automatically closing the valve and for regulating the movement thereof relative to a fluctuating pressure of fluid in a vessel, and manual means for reciprocating the stem thereby opening and closing the valve for discharging all or any desired amount of fluid contained in the vessel.

3. A valve of the character described, consisting of a casing, a valve seated in the casing, an inlet communicating with the casing above the valve seat and an outlet communicating with the casing below the valve, a reciprocatory stem on the valve, means for automatically closing the valve and for regulating the movement thereof relative to a fluctuating pressure of fluid in a vessel, and manual means for opening and closing the valve for the discharge of all or any desired amount of fluid contained in the vessel.

4. A valve of the character described, consisting of a casing, a valve seated in the casing, an inlet in the casing above the valve seat, an outlet from the casing below the valve, a reciprocatory stem on the valve, adjustable means for automatically closing the valve and for regulating the movement thereof relative to a fluctuating pressure of fluid in a vessel, and manual means for opening and closing the valve for the discharge of all or any desired amount of fluid contained in the vessel.

5. A valve of the character described, consisting of a casing, an inlet and an outlet arranged therein, a valve seated in the casing between the same, a reciprocatory stem on the valve, means for automatically closing the valve and for regulating the same relative to a fluctuating pressure of fluid in a vessel, manual means for opening and closing the valve, and accessible means for removing sediment from the valve casing.

JAMES ALLINGHAM.

Witnesses:
   Chas. C. Tillman,
   J. E. Hanson.